though it is growing more difficult to improve this, the better combination of properties obtained by the applicants is considered to be good progress.

3,394,008
PROCESS FOR THE MANUFACTURE OF BREAD WITH THE AID OF YEAST

Jacomina Lodder, Delft, and Gerrit Loggers, Rijswijk, Netherlands, assignors to Koninklijke Nederlandsche Gist- & Spiritusfabriek N.V., Delft, Netherlands, a corporation of the Netherlands
No Drawing. Continuation-in-part of application Ser. No. 211,429, July 20, 1962. This application Oct. 17, 1966, Ser. No. 586,976
Claims priority, application Netherlands, July 28, 1961, 267,717
3 Claims. (Cl. 99—90)

ABSTRACT OF THE DISCLOSURE

Production of novel bakers' yeast of the *Saccharomyces cerevisiae* strain and their use in manufacturing bread and bakery products.

---

The present application is a continuation-in-part application of co-pending, commonly assigned application Ser. No. 211,429, filed July 20, 1962, now abandoned.

It is the object of the invention to produce from inexpensive raw materials, e.g. molasses, a bakers' yeast with a good yield, good keeping qualities, good dispersibility, and powerful and constant gas formation in dough leading to the largest possible bread volume in the baking process.

None of the yeast strains present in nature or on the market has the combination of all these good properties to the desired degree. An important requirement to obtain a powerful and constant gas formation in dough and the largest possible bread volume in the baking process is the presence of enzymes necessary for the maltose fermentation.

Many known yeast strains of *Saccharomyces cerevisiae* which have been used for the production of bakers' yeast show when grown on molasses wherein no maltose is present and then being introduced into dough a decrease in the rate of the gas formation after consumption of the saccharose and fructose polymers from the flour. This decrease is due to a slow switch-over to maltose, which is caused by lack of maltase and maltose permease in those bakers' yeasts. When an improvement is attempted by adaptive forming of the enzymes, maltase and maltose permease, under the influence of pre-existing maltose present in the dough, the result is that the gas formation does not take place uniformly.

By cross-breeding of conventional bakers' yeast strains with other yeast strains, each of which individually cannot be used as bakers' yeast although they are able of fermenting maltose rapidly, new yeast strains can be obtained which, when grown on molasses, give bakers' yeasts of improved stability and activity. This cross-breeding is carried out by the combination of suitable monosporous cultures of different mating types and originating from different yeast strains. For the methods to be used, see Lindegren, The Yeast Cell, Its Genetics and Cytology (St. Louis, 1949).

The combination of the desired properties are:
(a) Formation of essential enzymes necessary for the maltose fermentation without the presence of maltose in the growing medium;
(b) Good keeping qualities;
(c) Good yield; and
(d) The obtaining of a good baking result.

To obtain these properties in one and the same yeast strain, the growing and selection of hybrids is the only method, which, however, requires thousands of test fermentations and baking tests. Thus, 2000 hybrids were obtained by cross-breeding, examined and selected by the applicants.

The above-mentioned properties of the known bakers' yeast are favorable already. As it is growing more difficult to improve this, the better combination of properties obtained by the applicants is considered to be good progress.

Comparative experiments between the applicants' yeast hybrids and the best known bakers' yeasts to determine the yield calculated on molasses, the keeping qualities and the gas formation in dough have been carried out. Moreover, results of baking tests have been obtained at the same time. Applicants' yeast strains are designated as hybrids *Saccharomyces cerevisiae* Ng 740 and *Saccharomyces cerevisiae* Ng 1777. Pure cultures of the said yeast strains have been deposited with the Central Bureau voor Schimmelcultures, Delft, under the above-mentioned numbers.

Attempts to describe certain yeast strains are found, for instance, in the Belgian patent specifications 584,371 and 584,372. Applicants consider the typification methods used in the Belgian patent specifications to be insufficient. Specifically, the spore information described in the latter appears to be highly variable because, depending upon the type of malt extract used as presporulation medium, very great differences in the percentage of spore-forming cells can be observed. The inoculation density too has some influence. The bios typification (Arch. of Biochemistry 14 (1947), pp. 369 ff.) is not always judged very favorably for the differentiation between variants of *Saccharomyces cerevisiae*. Applicants are further of this opinion that the sizes of the cells also form a rather dubious characteristic.

More effective characteristics may follow from a further research of the monosporous cultures which can be obtained from a yeast strain (determination of the mating type and the ratio of the number of $\alpha$-cultures:$a$-cultures: number of cultures without mating type. Another useful characteristic is the determination of the activity of the monosporous cultures in relation to desthiobiotin). Still, to distinguish their new hybrids from the bakers' yeast referred to in the Belgian patent specifications 584,371 and 584,372, applicants consider it necessary to mention the index figures there given. For purposes of differentiation, however, they wish to emphasize the more constant properties given by them (Table I, rows 1, 2, 3 and 4).

Below a description is given of the determinations which were carried out for the definition of the new yeast hybrids according to the application. The figures between brackets in this description refer to mediums, the composition of which is given infra. The results of the research of the new hybrids are listed in Table I. This table also includes the results of the typification according to the Belgian patent specifications 584,371 and 584,372 (rows 5, 6, 7, 8, 9, 10 and 11).

(1) Mating type

The mating type of the monosporous cultures is determined by bringing together in malt extract (1) (2 ml. of malt extract per tube) a small amount of the yeast to be examined with a small amount of yeast of Ng 3=α-type of yeast strain Ng 10=a-type, respectively (deposited with the C.B.S., under Nos. Ng 3 and Ng 10, respectively). After about 25 hours' incubation at 25° C., the malt-extract tubes are examined microscopically for the presence of zygotes. When zygotes have been formed with Ng 3, the monosporous culture belongs to mating type $a$ and when zygotes have been formed with Ng 10, it belongs to mating type α. If no mating reaction can be observed in either of the two tubes, the monosporous culture is mixed once more in malt-agar tubes with Ng 3 and Ng 10, respectively. After about 5 hours' incubation at 25° C., the tubes are examined microscopically to find out whether any zygotes have been formed. If even then no mating reaction can be observed in the two tubes, the monosporous culture is recorded as sterile. Now it is possible to determine the percent of α- cultures, a-cultures, and sterile cultures which are obtained from a large number (about 100) of monosporous cultures of one yeast strain. The ratio of the number of α-cultures to that of the a-cultures is practically constant for the yeasts examined.

(2) Spore formation of the monosporous cultures

As many bakers' yeasts appear to be not diploid, but triploid or even tetraploid, it is possible that the monosporous cultures have a higher ploidy than haploidy. From this it results that they can also form spores in that case. Spore formation is to be expected especially of the sterile monosporous cultures which may be diploid and of the aα-type. It is, however, found that the monosporous cultures with a mating reaction also include some which form spores.

It is thus possible to determine from one hundred monosporous cultures the percentage of monosporous cultures with mating type forming spores as well as the total number of monosporous cultures forming spores.

From a young monosporous culture (24 to 48 hours old) on malt agar, inoculation in a slanting acetate-agar tube takes place (4). Incubation takes place at 25° C. After two days and after one week, the tubes are examined for the formation of spores. This classification characteristic too can be considered reliable. Thus, it appears that none of the monosporous cultures of *Saccharomyces cerevisiae* Ng 740 with mating reaction form spores.

(3) Behaviour of the monosporous cultures towards desthiobiotin

About 2 ml. of a suspension of a young malt-agar culture in physiological salt solution is mixed with 20 ml. of molten biotin agar (2), cooled to about 47° C. This mixture is poured out into a Petri dish. After the agar has hardened, four (Schleicher and Schull No. 740–E) paper discs are put on it, on which discs have been placed 0.05 ml. of a solution of 0.5 μg./ml. of biotin and 0.05 ml. of a solution of 0.5 μg./ml. of desthiobiotin, respectively.

After about 24 hours, incubation at 30° C., it can be determined from the areas of growth whether the yeast strain can use desthiobiotin instead of biotin. In some cases, the growth of the yeast is so slow that the plate can only be judged after 48 hours. The percentage of desthiobiotin+ and desthiobiotin−monosporous cultures which a yeast can yield is constant. This is, therefore, also a property which makes for a clear differentiation between the yeast strains.

(4) Size of the vegetative cells

From a malt-agar tube, inoculation takes place in a 100-ml. flask containing 30 ml. of Difco malt extract (1). The culture is incubated for 40 hours at 30° C. Subsequently a slide is made and photographed. The magnification of the photographs is 600×, for instance. Length and width of a large number of cells are measured, and from this the average length and width per cell are determined rounded off to ½ μ.

This differentiation method is only moderately reliable. Particularly because of the variation in the size of the cell, it is often difficult to distinguish two bakers' yeasts from each other on the basis of their size.

(5) Percentage of spore germination

Spores from tetrasporous asci of a sporulating yeast culture are isolated in drops of yeast water-glucose-peptone (3) with the aid of a micromanipulator. The cultures are incubated at 25° C. When the culture in the drop has grown sufficiently, it is transferred with the aid of a sterile piece of filter paper to a small Freudenreich flask contining about 10 ml. of yeast water-glucose-peptone or malt extract. After having grown sufficiently, the yeast is transferred to a malt-agar tube. From the number of isolated spores the percentage is determined which develops into a colony and exhibits good growth also after transfer to the Freudenreich flask. This property again is not very reliable. For many yeasts, the germination percentages are too close together for them to be used for differentiation purposes.

The composition of the media used in the five criteria mentioned was as follows.

(1) Difco malt extract:
    120 g. of Difco malt extract
    1 litre of distilled water
    Sterilization: At 110° C. for 30 minutes.

(2) Biotin agar:
    Per litre of twice distilled water—
    3 g. of ammonium sulphate
    2 g. of $KH_2PO_4$
    1 g. sodium acetate 3 aq.
    0.25 g. of magnesium sulphate 7 aq.
    0.375 g. of calcium chloride 6 aq.
    10 mg. of l-trytophane
    5 mg. of inositol
    300 mg. of dl-aspartic acid
    20 g. of glucose
    0.5 g. of Difco casein hydrolysate (vitamin-free)
    1 ml. of a solution of trace elements which contains:
        1 mg. of $MnCl_2 \cdot 4$ aq..
        0.5 mg. of $FeCl_3 \cdot 6$ aq.
        1 mg. of $H_3BO_3$
        1 mg. of $ZnSO_4 \cdot 7$ aq.
        1 mg. of $TlCl_3$
        0.1 mg. of $CuSO_4 \cdot 5$ aq.
        0.1 mg. of KI
    40 μg. of vitamin $B_1$
    40 μg. of Ca pantothenate
    500 μg. of β-alanine
    100 μg. of nicotinic acid amide
    20 g. of Difco agar.

The medium as adjusted to pH=4.5 and sterilized for 30 minutes at 110° C.

(3) Yeast water-glucose-peptone:
    1 l. of mains water
    10 g. of Difco yeast extract
    20 g. of peptose
    20 g. of glucose
    Sterilization at 110° C. (15 mins.)

(4) Acetate medium:
    15 g. of Difco agar
    6.63 g. of sodium acetate 3 aq.
    Mains water up to 1 litre. pH=6.5–7.0.
    Sterilization: 20 mins. at 120° C.

TABLE I

| Row | | Ng 740 | Ng 1777 |
|---|---|---|---|
| 1 | Percent mating types of α, a, and o | 20±2% α / 52±5% a / 27±6% o | 51±2% α. / 34±2% a. / 14±2% o. |
| 2 | Ratio α:a | 0.38 | 1.55 |
| 3 | Number of (α+a) forming spores again | 7.5±2.5% of the total. 0% of α+a. | 15±2% of the total. 9±2% of α+a. |
| 4 | Monosporous cultures from tetrasporous asci, which are desthiobiotin+ and desthiobiotin−, respectively. | 50±2% of desthiobiotin+50±2% of desthiobiotin. | 82.5±2% of desthiobiotin+17.5±2% of desthiobiotin. |
| 5 | Size of the vegetative cells | 10 x 7.5 / 10 x 8 | 9 x 7. |
| 6 | Percentage of spore formaion after 4 days | Trifax presporulation 20% of asci, Difco presporulation 4% of asci. | Trifax presporulation: 61–78% of asci, Difco presporulation: 81% of asci. |
| 7 | Percentage of spore germination, percent | 38 | 67. |
| 8 | Inositol | 5–12 | 2–5. |
| 9 | Percentage of growth in the medium without $B_1$ and without $B_6$ with reference to the blank medium. | 3–8 | 2–4. |
| 10 | Percentage of growth upon addition of uracil with refrence to the blank medium. | 63–76 | 87–124. |
| 11 | Percentage of growth with casein hydrolysate with reference to the blank medium with casein hydrolysate, but with omission of $B_1$ and $B_6$. | 1–3 | 1–1. |

To demonstrate that the novel hybrids defined by the properties described above are actually superior to conventional bakers' yeast in the aspects mentioned above, the following comparative experiment as to the yield calculated on molasses, the gas formation in dough, the keeping qualities and finally the bread volume were conducted.

The yeast strains for the comparative experiment were grown in a molasses mixture consisting of 20% of cane molasses and 80% of beet molasses and had a saccharose content of 50% and an assimilable nitrogen content of 0.7%. The production took place by fermentations with incremental feeding, commonly used in the practical production of bakers' yeast (J. White, Yeast Technology, London, 1954). The yeast strains were grown in such a way that a protein content of 52.5±1% and a $P_2O_5$-content of 3.3±0.2%, both calculated on dry weight, was obtained.

The yields obtained for the various yeast strains were indicated as the number of grams of yeast with 28% of dry substance obtained from 100 grams of molasses.

Yeast:                    Yield based on molasses
- Saccharomyces cerevisiae Ng 740 _____ 96.0
- Saccharomyces cerevisiae Ng 1.777 _____ 98.8
- Saccharomyces cerevisiae ATCC 13.602 _____ 97.2
- Saccharomyces cerevisiae ATCC 13.601 _____ 97.3

In order to obtain reliable figures, the yield experiments were carried out in 8-fold.

The gas formation value and the keeping quality of the various bakers' yeasts were determined by the amount of gas formed in dough from fresh yeast and by the same amount of yeast having been stored for 7 days at 21° C., according to the method described in The Journal of the Institute of Brewing 65, (1959) 39, by S. Burrows and J. S. Harrison. The experiments were carried out in 8-fold.

The qualities of the yeast strains are calculated from the bread volume measured after the proofing and baking process. For the various strains of yeast, the same amount of dough was taken. The composition of the dough was 2 kg. of flour, 2% of salt, 53% of water and a variable percentage of yeast. The kneading time was 8 minutes. The proofing scheme was as follows: dough proof 60 minutes, intermediate proof 30 minutes, measurement pan proof: 55 minutes. The dough handlings were mechanical and the the various proofs took place at 27° C. For each kind of yeast, 2 quantities of yeast were used. The average volumes of every three loaves baked with a same kind of yeast were plotted on graph versus the quantities of yeast. For a given standard volume, the value ratio of the various bakers' yeasts is then mentioned.

| Type of yeast | Dry substance content | grams of yeast per 50 kg. of flour | Average bread volume |
|---|---|---|---|
| Sacch. cerev. Ng 740 | 28.2 | 700 / 850 | 3,665 / 3,975 |
| Sacch. cerev. Ng 1.777 | 27.9 | 700 / 850 | 3,620 / 3,920 |
| Sacch. cerev. ATCC 13.601 | 29.3 | 800 / 950 | 3,435 / 3,700 |
| Sacch. cerev. ATCC 13.602 | 27.8 | 700 / 850 | 3,470 / 3,750 |

By linear intrapolation or extrapolation, the following quality ratios are calculated for a standard volume of 3700 ml. per loaf of 800 grams; 100 parts by weight of 100 Ng 740=103 parts by weight of Ng 1.777=133 parts by weight of ATCC 13.601=115 parts by weight of ATCC 13.602.

Various modifications of the processes of the invention may be made without departing from the spirit or scope thereof and it is to be understood that the invention is

TABLE II

| Yeast | ml. $CO_2$ 0–45 min. | ml. $CO_2$ 45–90 min. | ml. $CO_2$ 0–90 min. | ml. $CO_2$ after 7 days storage at 21° C. 0–90 min. | Keeping quality calculated on the gas formation of 0–90 min., percent |
|---|---|---|---|---|---|
| Sacch. cerev. Ng 740 | 56 | 69 | 125 | 99 | 79 |
| Sacch. cerev. Ng 1.777 | 52 | 69 | 121 | 97 | 80 |
| Sacch. cerev. ATCC 13.601 | 45 | 60 | 105 | 80 | 76 |
| Sacch. cerev. ATCC 13.602 | 50 | 66 | 116 | 63 | 54 |

In addition, a number of baking tests have been carried out comparing the novel hybrids Ng 740 and Ng 1777 with various conventional bakers' yeasts.

to be limited only as defined in the appended claims.

We claim:

1. In the process of manufacturing bread and bakery products from dough containing yeast, the improvement which comprises employing as the yeast at least one yeast selected from the group consisting of *Saccharomyces cerevisiae* Ng 740 and *Saccharomyces cerevisiae* Ng 1777.

2. The process of claim 1 wherein the yeast is *Saccharomyces cerevisiae* Ng 740.

3. The process of claim 1 wherein the yeast is *Saccharomyces cerevisiae* Ng 1777.

References Cited

UNITED STATES PATENTS 2,698,828   1/1955   Bernhauer et al. ____ 195—95 X

FOREIGN PATENTS 868,621   5/1961   Great Britain.

ALVIN E. TANENHOLTZ, *Primary Examiner.*